(12) United States Patent
Mardikian

(10) Patent No.: US 10,012,441 B2
(45) Date of Patent: Jul. 3, 2018

(54) WASTE MANAGEMENT SYSTEM AND METHOD

(71) Applicant: Albert A. Mardikian, Corona del Mar, CA (US)

(72) Inventor: Albert A. Mardikian, Corona del Mar, CA (US)

( * ) Notice: Subject to any disclaimer, the term of this patent is extended or adjusted under 35 U.S.C. 154(b) by 834 days.

(21) Appl. No.: 14/242,453

(22) Filed: Apr. 1, 2014

(65) Prior Publication Data

US 2015/0276312 A1  Oct. 1, 2015

(51) Int. Cl.
| F26B 7/00 | (2006.01) |
| F26B 15/26 | (2006.01) |
| F26B 20/00 | (2006.01) |
| F26B 25/00 | (2006.01) |
| B01J 2/00 | (2006.01) |
| F26B 5/14 | (2006.01) |
| F26B 11/04 | (2006.01) |

(52) U.S. Cl.
CPC ............... *F26B 20/00* (2013.01); *B01J 2/00* (2013.01); *F26B 5/14* (2013.01); *F26B 7/00* (2013.01); *F26B 11/04* (2013.01); *F26B 11/049* (2013.01); *F26B 11/0463* (2013.01); *F26B 11/0481* (2013.01); *F26B 25/001* (2013.01); *F26B 2200/02* (2013.01); *F26B 2200/18* (2013.01)

(58) Field of Classification Search
CPC .......... F26B 20/00; F26B 7/00; F26B 25/001; F26B 17/106; F26B 17/1408
USPC ... 34/147, 423, 418, 398, 435, 62, 499, 241; 44/589; 198/676, 666, 660, 661, 662
See application file for complete search history.

(56) References Cited

U.S. PATENT DOCUMENTS

| 2,977,873 | A | * | 4/1961 | Crane | B30B 11/24 100/142 |
| 3,100,143 | A | * | 8/1963 | Doggett | A23B 7/022 34/331 |
| 3,506,414 | A | * | 4/1970 | Skendrovic | B03B 9/06 110/220 |
| 3,777,680 | A | * | 12/1973 | Eck | F23G 5/28 110/225 |
| 4,458,428 | A | * | 7/1984 | Saeman | B01J 2/12 34/167 |
| 4,922,989 | A | * | 5/1990 | Backlund | D21D 5/02 162/24 |

(Continued)

FOREIGN PATENT DOCUMENTS

EP  0722486 A1 * 7/1996
JP  S50158970 A * 12/1974

*Primary Examiner* — John McCormack
(74) *Attorney, Agent, or Firm* — Morland C. Fischer

(57) ABSTRACT

A waste management system ad method for processing and reusing organic waste such as food, green compost, and the like. The waste is delivered from a shredder to three sequential augers, each having a rotating shaft and a helically-wound blade spiraling therealong. The blades of the augers compress the waste and extract liquid therefrom to be drained into a tank for subsequent use as a fuel or a fertilizer. The remaining organic waste is then heated and dried in a dual drum dryer. From the dryer, the waste is delivered to a pelletizer having an apertured shaping plate extending thereacross through which the waste is pushed and shaped into solid pellets. The hot and dry pellets are cooled within a dual drum cooler. From the cooler, the organic waste pellets are collected, packaged and distributed.

20 Claims, 12 Drawing Sheets

(56) References Cited

U.S. PATENT DOCUMENTS

| | | | | |
|---|---|---|---|---|
| 5,387,267 A | * | 2/1995 | Warf | B03B 9/06 |
| | | | | 210/511 |
| 5,540,391 A | * | 7/1996 | Anderson | B01J 19/28 |
| | | | | 241/17 |
| 5,843,769 A | * | 12/1998 | Jonninen | C05F 17/0205 |
| | | | | 435/290.2 |
| 6,675,876 B2 | * | 1/2004 | Yamashita | B29C 33/044 |
| | | | | 165/89 |
| 2010/0043246 A1 | * | 2/2010 | Smith | B30B 11/225 |
| | | | | 34/147 |
| 2010/0293846 A1 | * | 11/2010 | Shaffer | B30B 9/067 |
| | | | | 44/589 |
| 2014/0076693 A1 | * | 3/2014 | Pankoke | B65G 33/18 |
| | | | | 198/617 |
| 2014/0223810 A1 | * | 8/2014 | Nordin | C10B 7/10 |
| | | | | 44/589 |
| 2014/0259895 A1 | * | 9/2014 | Mason | C10L 5/44 |
| | | | | 44/589 |

* cited by examiner

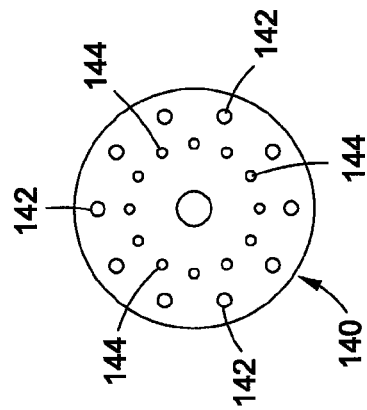
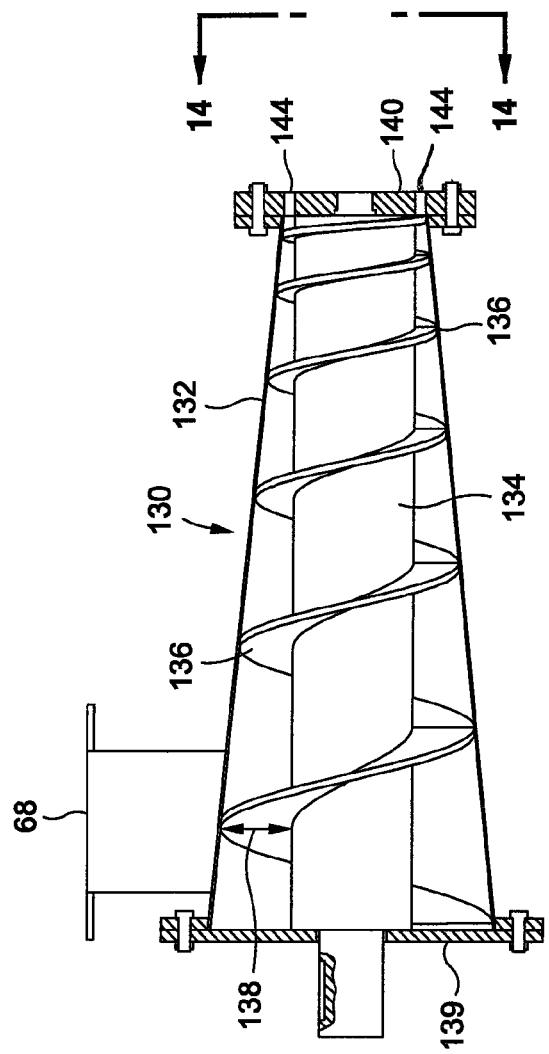

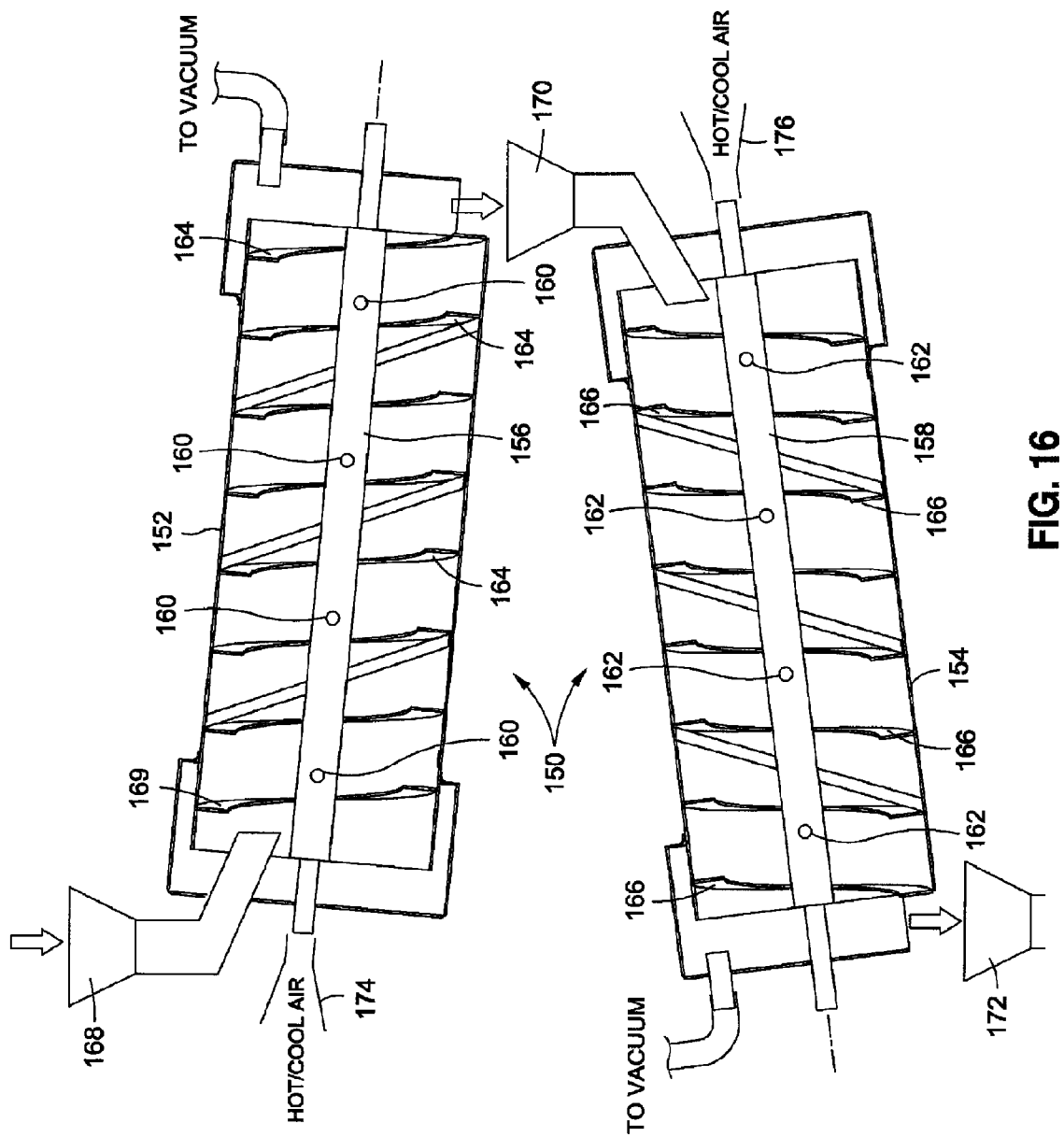

WASTE MANAGEMENT SYSTEM AND METHOD

BACKGROUND OF THE INVENTION

1. Field of the Invention

This invention relates to a compact and efficient waste management system for processing organic food waste, green compost material, and the like in order to produce sources of clean energy, fuel and fertilizer. Organic waste is shredded, compressed so that the liquid is extracted therefrom, heated and dried, shaped into solid pellets, and cooled to be suitable for packaging and distribution.

2. Background Art

In a "green" society, it is becoming increasingly important to be able to recycle organic waste that might otherwise be disposed of such that the organic components thereof are lost. For example, scraps of food and green waste discarded by restaurants, hotels and food service companies often wind up in landfills where they are left to decay. Although organic waste processing apparatus are known, such apparatus are typically large, complex, costly and, therefore, inefficient to operate. By way of example, composting machines sometimes require as long as 8 to 10 weeks to be able to process and recycle green waste, whereby such machines are impractical for use on a large scale basis where large volumes of organic waste must be processed quickly and without requiring large waste storage areas and the inherent disadvantages associated therewith.

Accordingly, it would be desirable to have access to a compact waste management system where large volumes of food waste, green compost material, and the like can be quickly and efficiently processed and converted to useful by-products such as clean energy, fuel and fertilizer. Reference may be made in this regard to my patent application Ser. No. 13/371,550 published on Aug. 15, 2013 under Publication No. US2013/0205613 for an example of such a compact and efficient waste management system.

SUMMARY OF THE INVENTION

In general terms, a compact and efficient waste management system and method are disclosed for processing organic food waste, green compost material and the like to produce sources of clean energy, fuel and fertilizer. A load of organic waste to be processed is initially shredded by a vertical shredder. The shredded waste is then fed to a first auger having a rotating shaft and a helically-wound blade which spirals along the shaft. The blade is rotated by the shaft to compress the shredded waste and squeeze liquid therefrom. The liquid extracted by the first auger is supplied to a mixer tank. Next, the residue waste is pushed (e.g., pumped) into a compound auger assembly including second and third sequentially coupled augers, each having a helically-wound blade that spirals around a rotating shaft. The blades are rotated by the shafts to further compress the organic waste and squeeze the remaining liquid therefrom. The liquid extracted by the second and third augers of the compound auger assembly is also supplied to the mixer. The liquid collected within the mixer is stirred, heated and processed for use as a source of clean energy, fuel or a liquid fertilizer. The dehydrated shredded waste is pushed through a sizing plate located across the exit end of the compound auger assembly to be cut into smaller pieces.

The dehydrated organic waste pieces which emerge from the compound auger assembly are delivered to a dual drum heating dryer which includes a stationary outer drum, a rotating inner drum surrounded by the outer drum, and a hollow shaft extending longitudinally through the inner drum. Each of the outer and inner drums surrounds a blade which spirals therethrough and is rotated in response to a rotation of the shaft to push the waste pieces through the heating dryer. The hollow shaft communicates with a source of hot air which heats and dries the waste pieces moving through the outer and inner drums by way of vent holes formed in the shaft and perforations formed through the inner drum.

From the dual drum heating dryer, the heated and dried organic waste pieces are delivered to a pelletizer which includes a rotating shaft and a blade which spirals along the shaft. The waste pieces are moved through the pelletizer in response to a rotation of the shaft. A shaping plate having apertures formed therein is located across the exit end of the pelletizer through which the waste pieces are pushed to produce solid organic pellets. A heat containment enclosure that is located at the exit end of the pelletizer is supplied with hot air to further dry the pellets produced by the pelletizer.

The heated pellets which emerge from the pelletizer are now supplied to a dual drum cooling dryer which, like the dual drum heating dryer, include a stationary outer drum, a rotating inner drum surrounded by the outer drum, and a hollow shaft extending longitudinally through the inner drum. Each of the outer and inner drums surrounds a blade which spirals therethrough and is rotated in response to a rotation of the shaft to push the solid waste pellets through the cooling dryer. The hollow shaft communicates with a source of cool air which cools the pellets moving through the outer and inner drums by way of vent holes formed in the shaft and perforations formed through the inner drum. The cooled pellets are then relocated from the dual drum cooling dryer to a packaging station where the pellets are collected, packaged and distributed for use (e.g., as a fertilizer).

BRIEF DESCRIPTION OF THE DRAWINGS

FIGS. 13 and 14 show an alternate embodiment for the pelletizer shown in FIG. 12;

FIG. 16 shows a partial cross-section of an alternate embodiment for the dual drum heating dryer shown in FIG. 5.

DESCRIPTION OF THE PREFERRED EMBODIMENT

Figure 1:
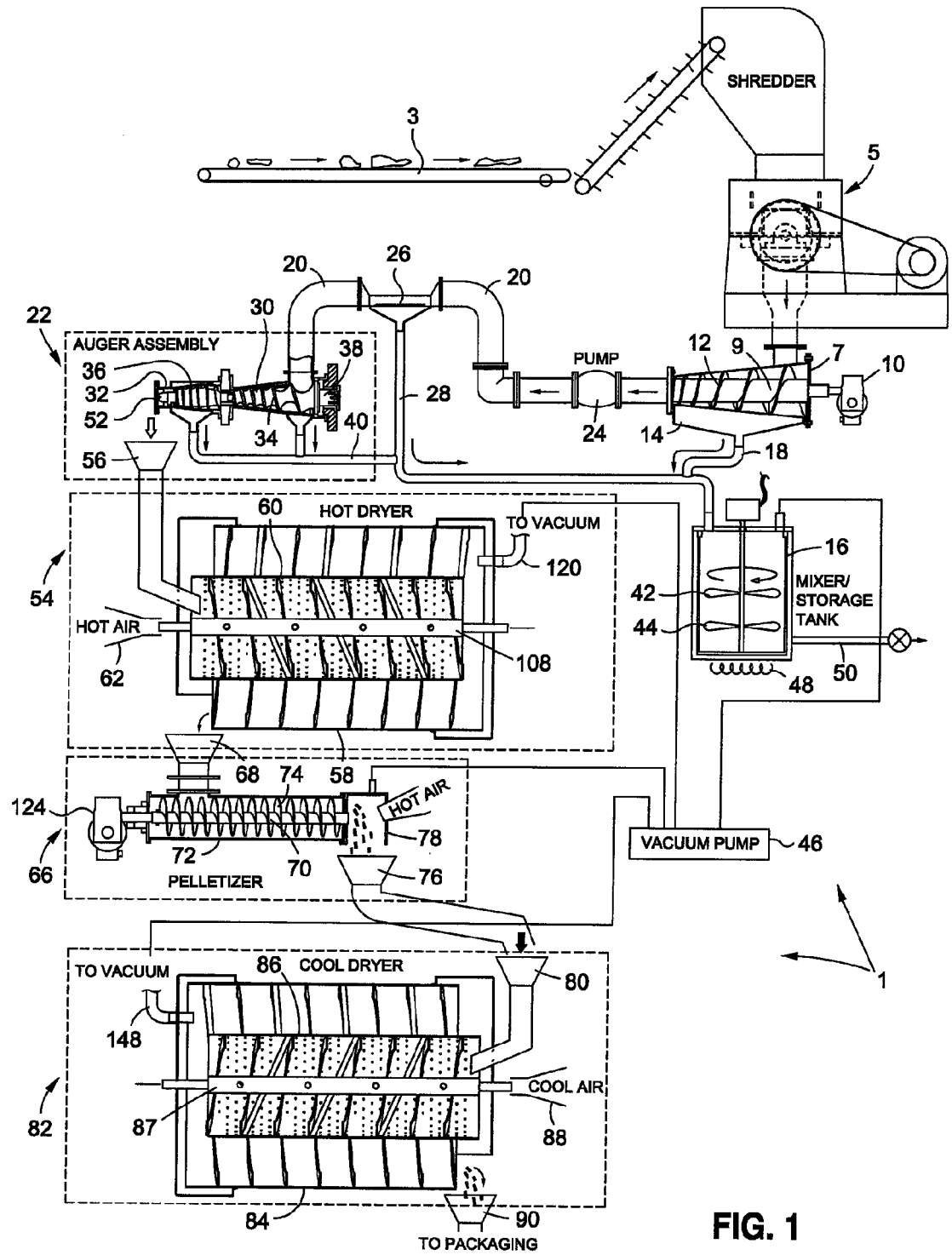
FIG. 1 illustrates a waste management system in accordance with a first preferred embodiment of this invention for processing organic waste into a source of clean energy, fuel or a fertilizer.

An overview of a compact waste management system 1 and method for efficiently processing organic food waste, green compost material, and the like, to produce sources of clean energy, fuel and fertilizer according to a first preferred embodiment of this invention is provided while referring to FIG. 1 of the drawings. Initially a load of organic waste to be processed is dumped on a conveyer 3. The load can be carried to the conveyer by any conventional transport means such as a dump truck. Non-organic debris (e.g., glass and plastics) is first removed from the load, and the remainder is delivered via conveyor 3 to a motor-driven vertical shredder 5. Reference may be made to my Patent Application No. US2013/0205613 published Aug. 15, 2013 for an example of a shredder which is suitable to shred the load of waste delivered thereto. Therefore, the details of shredder 5 are incorporated herein by this reference.

The shredded waste is then deposited, by means of gravity, into a first auger 7. The first auger 7 has a shaft 9 that is coupled to and rotated by a motor 10. A helically-wound blade 12 spirals continuously around the shaft 9 of auger 7. The successive turns of blade 12 are spaced closer together from the intake end of auger 7 (adjacent shredder 5) to the opposite exit end. Moreover, the height of successive turns of the blade 12 relative to shaft 9 decrease from one turn to the next starting from the intake end of the auger 7, whereby the helically-wound blade 12 has a conical profile.

The motor-driven shaft 9 rotates so that the turns of the helically-wound blade 12 compress and squeeze liquid from the organic waste that is delivered to and moved through the auger 7. The liquid that is squeezed from the waste flows from a liquid collection pan 14 below shaft 9 into a mixer tank 16 by way of an auger drain pipe 18. The compressed waste is then pushed by the rotating helically-wound blade 12 past the exit end of auger 7 and into a pipe 20. The pipe 20 extends between the first auger 7 and a compound auger assembly 22. An optional (e.g., cement) pump 24 may be connected within pipe 20 to facilitate the transfer of waste from the first auger 7 to the compound auger assembly 22. In addition, a screen covered drain 26 may also be connected within the pipe 20 so that liquid which leaks from the waste previously squeezed by the rotating helically-wound blade 12 of auger 7 flows into the mixer tank 16 by way of a drain pipe 28.

Figure 2:
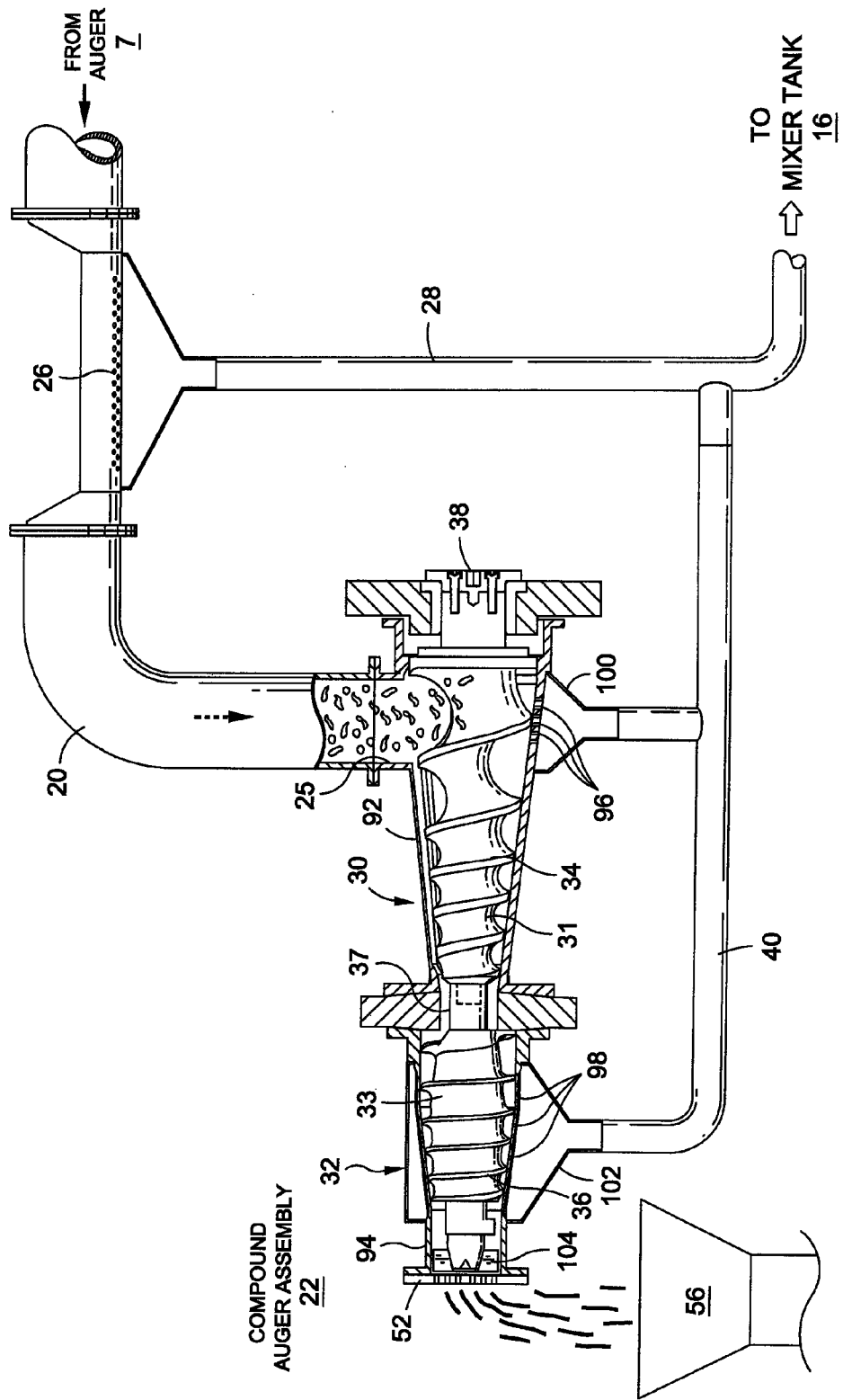
FIG. 2 is a partial cross-section of a compound auger assembly to compress and squeeze liquid from organic waste delivered thereto.

The compound auger assembly 22 into which the organic waste is pumped from the pipe 20 includes axially-aligned second and third augers 30 and 32 that are sequentially connected end-to-end one another by a support bearing (designated 37 in FIG. 2). Each of the second and third augers 30 and 32 has a shaft (designated 31 and 33 in FIG. 2) and a helically-wound blade 34 and 36 which spirals continuously therearound. The compound auger assembly 22 includes a motor 38 which is coupled to the shaft of the second auger 30 to cause a rotation thereto. A rotation of the shaft of the second auger 30 is imparted to the shaft of the third auger 32 by means of the support bearing 37 located therebetween.

As is best shown while referring currently to FIGS. 1 and 2, the blade 34 of the second auger 30 is helically-wound and spirals continuously around the shaft 31 thereof so that successive turns of blade 34 are spaced closer together starting from the intake end of auger 30 (adjacent pipe 20). Moreover, the height of successive turns of the blade 34 relative to shaft 31 decrease from one turn to the next starting from the intake end of auger 30. Likewise, the blade 36 of the third auger 32 is helically-wound and spirals continuously around the shaft 33 thereof so that successive turns of blade 34 are spaced closer together starting from the intake end of auger 32 (adjacent the second auger 30). Moreover, the height of successive turns of the blade 36 relative to shaft 33 decrease from one turn to the next starting from the intake end of auger 32. It may be appreciated, therefore, that each of the helically-wound blades 34 and 36 of the second and third augers 30 and 32 of the compound auger assembly 22 is provided with a conical profile.

As in the case of the first auger 7, the helically-wound blades 34 and 36 of the second and third augers 30 and 32 are rotated by their respective shafts 31 and 33 so as to squeeze additional liquid from the organic waste that is pumped to the compound auger assembly 22 via pipe 20. However, the turns of the helically-wound blade 34 of the second auger 30 are spaced closer together than the turns of the helically-wound blade 12 of the first auger 7, and the turns of the helically-wound blade 36 of the third auger 32 are spaced closer together than the turns of the helically-wound blade 34 of the second auger 30. Thus, it may be appreciated that the waste is squeezed more tightly as it is transferred along a liquid extraction path through the serially-connected first, second and third augers 7, 30 and 32 and around the support bearing 37 between augers 30 and 32 of the compound auger assembly 22.

The liquid that is squeezed from the waste by the second and third augers 30 and 32 of the compound auger assembly 22 flows from respective liquid collection pans (designated 100 and 102 in FIG. 2) into the mixer tank 16 by way of a common auger assembly drain pipe 40. The auger assembly drain pipe 40 may be joined to the drain pipe 28 from drain 26 (as shown) or independently connected directly to the mixer tank 16. In either case, all of the liquid that has been squeezed from the shredded organic waste following compression flows into the mixer tank 16.

Referring once again to FIG. 1, the mixer tank 16 is a sealed container that may be identical to the tank that is shown in my aforementioned published Patent Application No. US2013/0205613, the details of which are incorporated herein by this reference. Motor-controlled stirring blades 42 and 44 are rotated within the tank 16 to agitate and mix the liquid contents which are delivered thereto from the first, second and third augers 7, 30 and 32. A vacuum pump 46 is coupled to the mixer tank 16 to suction thereto moisture that is removed from the waste downstream from the augers 7, 30 and 32. A heater 48 lies in proximity to the mixer tank 16 to heat the liquid therewithin to a temperature (e.g., 150° F.) that is suitable to eliminate odor and kill some, but not all, bacteria. The heated liquid can be stored within the mixer tank 16 until some or all of the liquid is transferred from the tank for processing by way of a valve-controlled drain pipe 50. To this end, the liquid extracted from the organic waste can be processed according to conventional techniques for a variety of useful applications including, but not limited to, fertilizer, biodiesel, propane and sources of hydrogen and nitrogen gas.

Once the liquid is squeezed out by means of the rotating helically-wound blades 12, 34 and 36 of the serially-connected augers 7, 30 and 32, the dehydrated wet organic waste residue is cut into small pieces by a perforated sizing plate 52 (best shown in FIG. 4) that is located across the exit end of the third auger 32. The small pieces which are created by perforations formed in sizing plate 52 as the solid waste is pushed through the compound auger assembly 22 fall under the influence of gravity into a dual drum heating dryer 54 through an intake chute 56. Details of the heating dryer 54 will be provided while referring to FIGS. 5-11 hereinafter. Briefly, however, the dual drum heating dryer 54 includes coaxially-aligned stationary outer and rotating inner cylindrical drums 58 and 60 and a heater duct 62 which communicates with a source of heat (not shown). The heater duct 62 is axially aligned with a hollow vented shaft 108 to which the inner one of the drums 60 is connected for rotation therewith (best shown in FIG. 5). The wet organic waste pieces that are delivered to dryer 54 via intake chute 56 are moved along and through successive ones of the rotating inner and stationary outer drums 60 and 58 during which the pieces are heated and dried by the hot air supplied thereto by way of the heater duct 62 and the vented shaft 108 aligned therewith.

Figure 12:
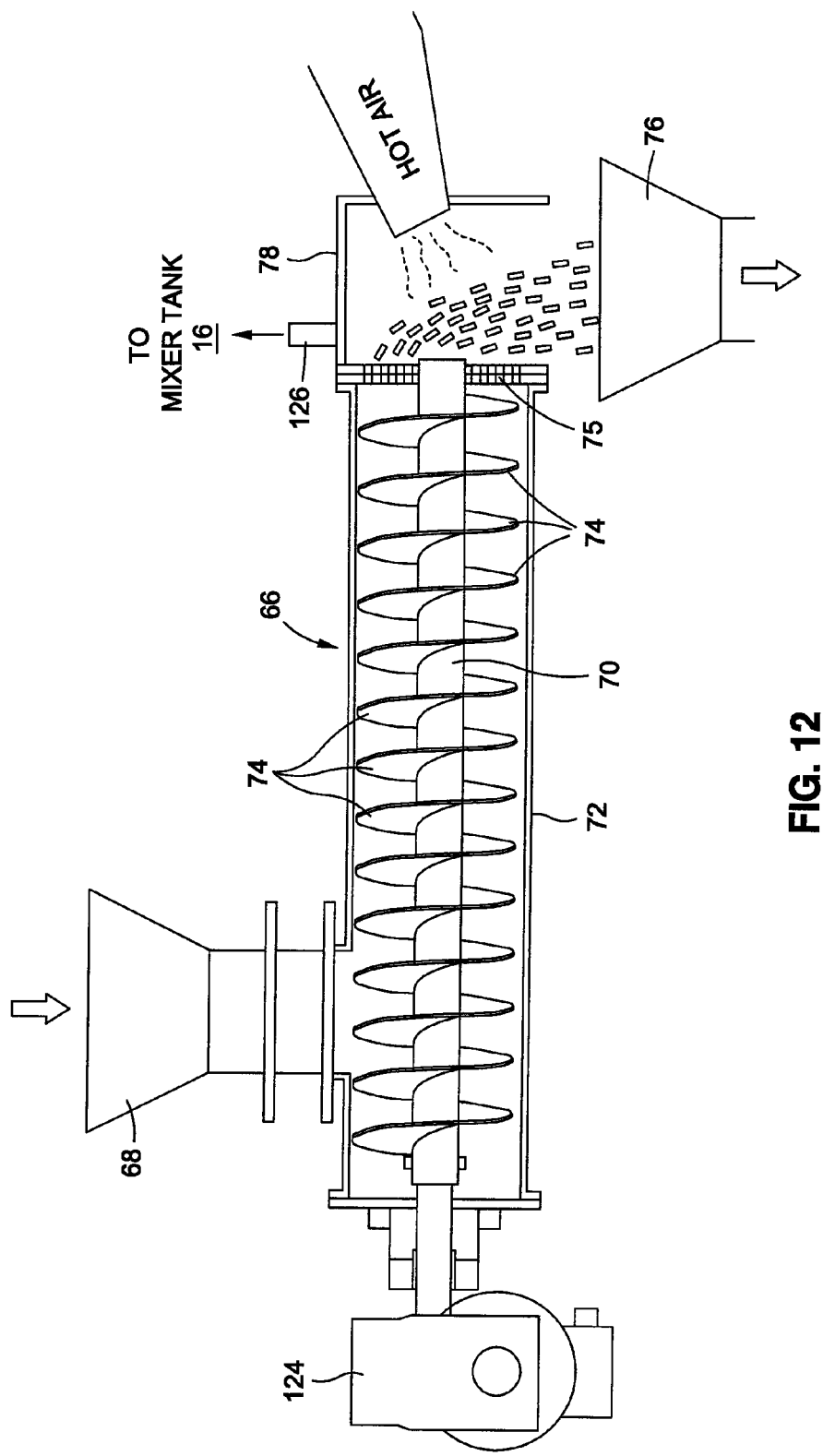
FIG. 12 shows a first embodiment for a pelletizer that is coupled to the dual drum heating dryer of FIG. 5.

The heated and now semi-dry pieces of organic waste emerge from the dual drum hot dryer 54 at the outer drum 58 thereof for receipt by a pelletizer 66 through an intake chute 68. The pelletizer 66 may be identical to that described in my aforementioned published Patent Application No. US2013/0205613. Therefore, the details thereof are incorporated herein by this reference. Briefly, however, and as is best shown in FIG. 12, the pelletizer 66 includes a shaft 70 which extends axially through a cylindrical pelletizer housing 72 to be coupled to and rotated by a motor 124. A blade 74 spirals continuously around and is rotated with the shaft 70 to advance the semi-dry waste pieces from the intake chute 68 through the pelletizer housing 72 to be pushed through an apertured shaping plate (designated 75 and best shown in FIG. 12). The pellets emerging from the shaping plate 75 of pelletizer 66 are deposited into an output chute 76 at the exit end of the pelletizer 66.

A heat containment enclosure 78 is attached to the housing 72 at the exit end of pelletizer 66 between the apertured shaping plate 75 thereof and the outlet chute 76. A source of heat (not shown) communicates with the heat containment enclosure 78 to blow hot air thereto in order to heat and completely dry the pellets which exit the pelletizer 66 and fall into the outlet chute 76. Each of the dual drum dryer 54 and the heat containment enclosure 78 of the pelletizer 66 are coupled to the aforementioned mixer tank 16 by way of the vacuum pump 46 so that moisture can be suctioned from the waste which travels along a heating and drying path that runs between the intake chute 56 of the dryer 54 and the outlet chute 76 of the pelletizer 66. By virtue of the foregoing, the pellets which drop into the outlet chute 76 of pelletizer 66 are hot and dry.

The outlet chute 76 of pelletizer 66 is aligned with an intake chute 80 to a dual drum cooling dryer 82 so that the hot and dry pellets drop, under the influence of gravity, through chutes 76 and 80. The dual drum cooling dryer 82 is substantially identical to the earlier-described dual drum heating dryer 54. That is, the cooling dryer 82 includes coaxially-aligned outer and inner cylindrical drums 84 and 86 that surround a hollow vented shaft 87 which extends longitudinally through the inner drum 86. However, rather than having a heater duct like that designated 62 for the dual drum heating dryer 54, the dual drum cooling dryer 82 includes a cooling duct 88. The cooling duct 88 is axially aligned with the vented shaft 87 and coupled to a source of cool or cold air (not shown) by which to supply cool or refrigerated air to the inner one of the drums 86. The pellets which are delivered to dryer 82 via intake chute 80 are moved along and through successive ones of the outer and inner drums 84 and 86 during which the previously heated pellets are now cooled to about room temperature by the cool air supplied thereto by way of the cooling duct 88. As in the case of the heating dryer 54, the dual drum cooling dryer 82 is coupled to the mixer tank 16 by vacuum pump 46 by which to suction away any remaining moisture from the pellets being cooled by dryer 82.

The cooled and dry pellets emerge from the dual drum cooling dryer 82 at the outer drum 84 thereof to be removed from the waste management system 1 of FIG. 1 by way of a packaging chute 90. The organic waste pellets are now sized and ready to be collected, packaged and shipped for any suitable use (e.g., such as a fertilizer) where an organic material is desirable.

Figure 3:
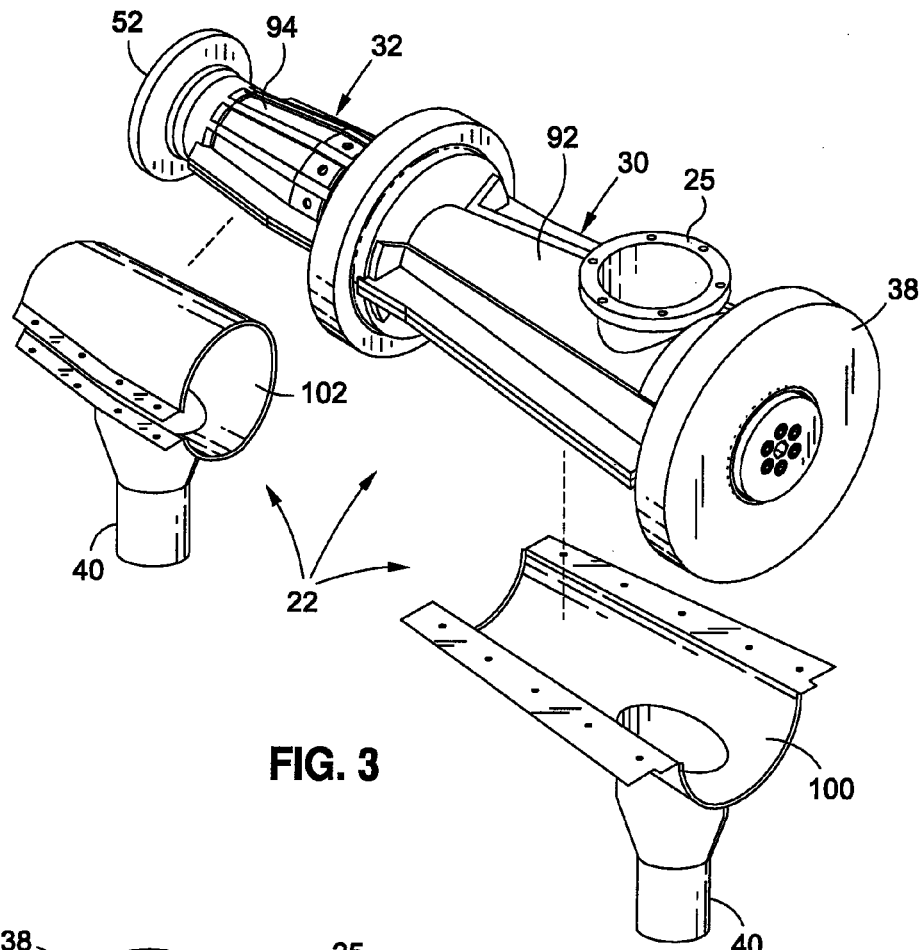
FIGS. 3 and 4 show details of the compound auger assembly of FIG. 2.
Figure 4:
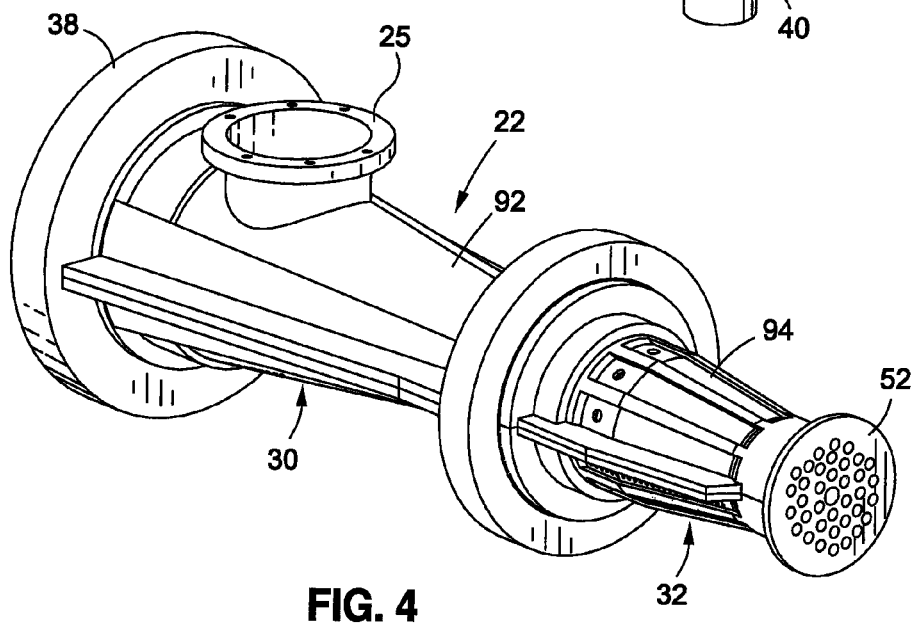
Figure 5:
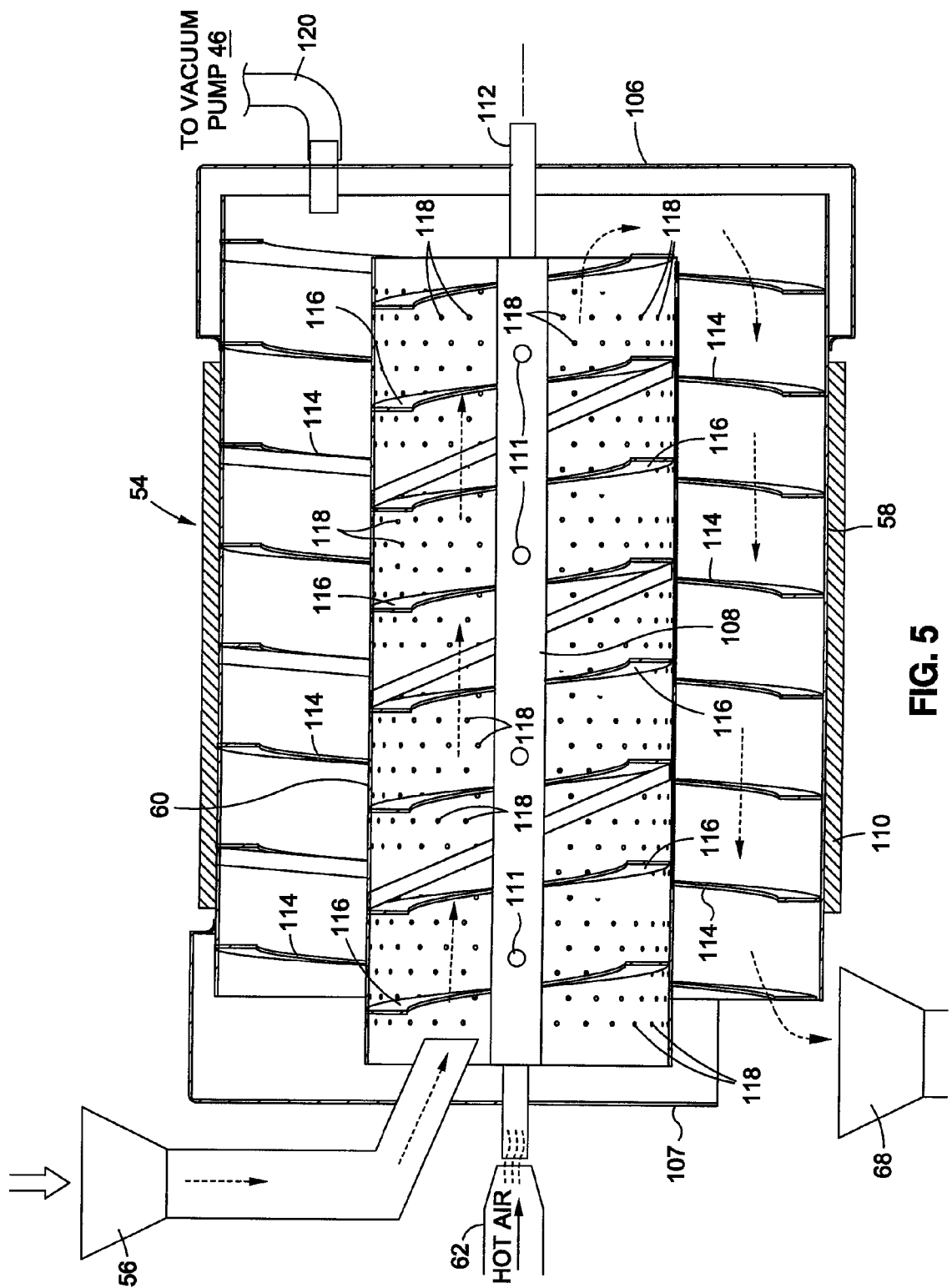
FIG. 5 is a partial cross-section of a first embodiment for a dual drum heating dryer that is coupled to the compound auger assembly of FIG. 2.
Figure 6:
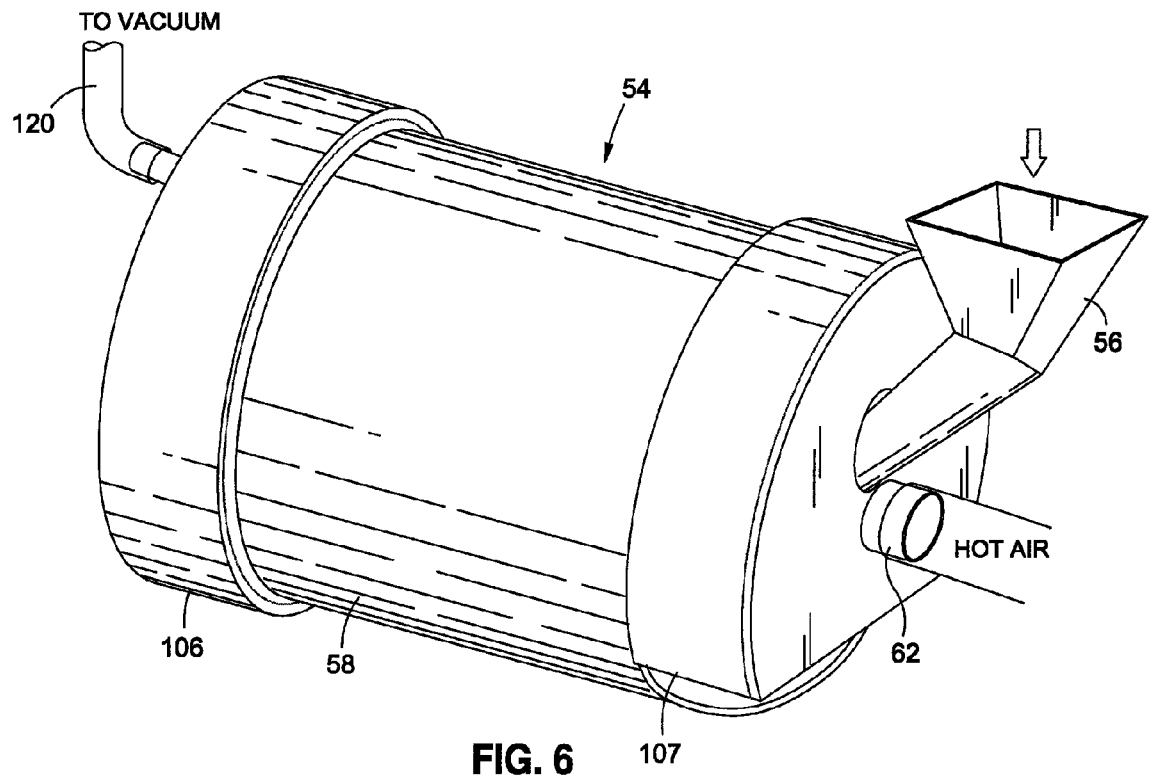
FIGS. 6-11 show details of the dual drum heating dryer of FIG. 5.
Figure 7:
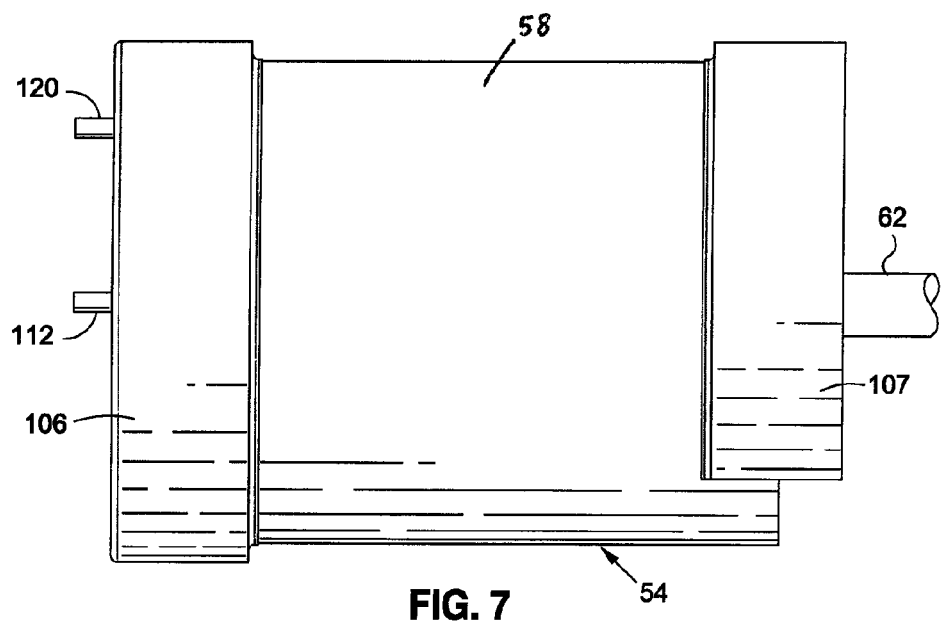
Figure 8:
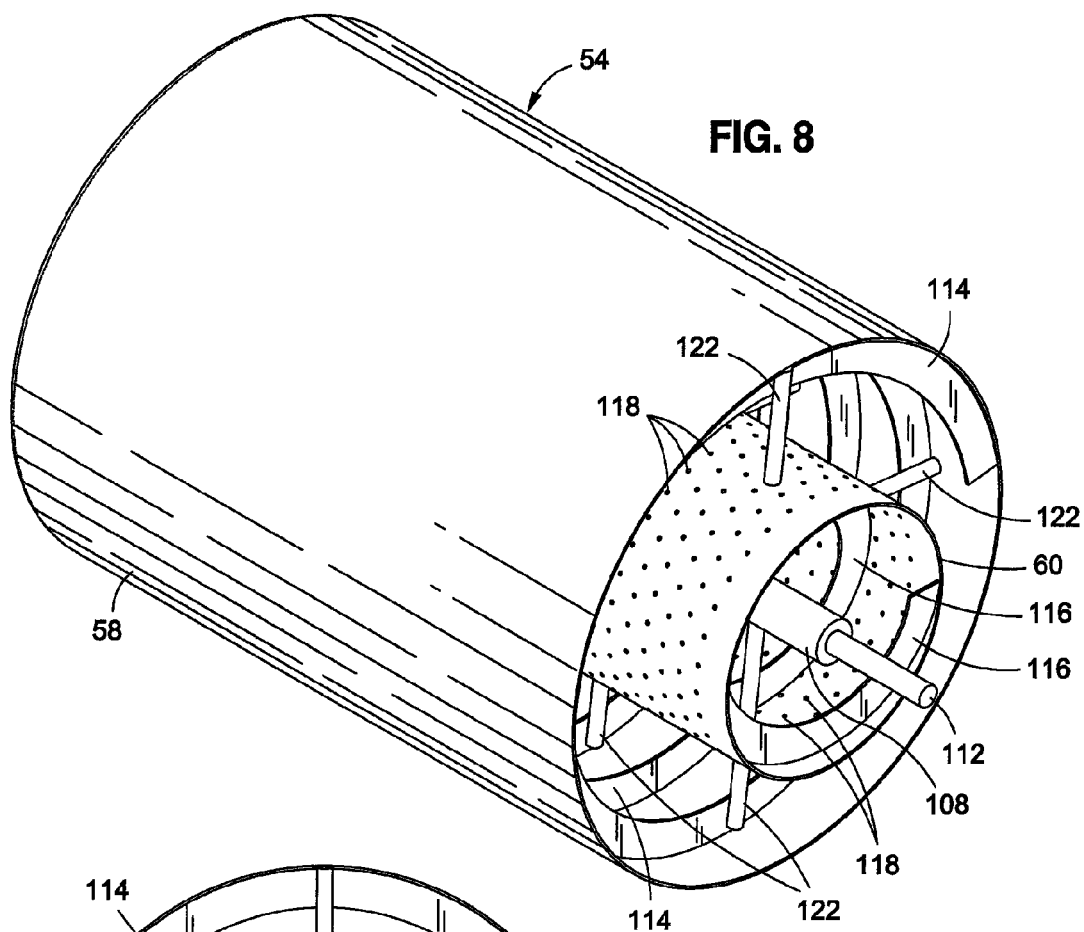
Figure 9:
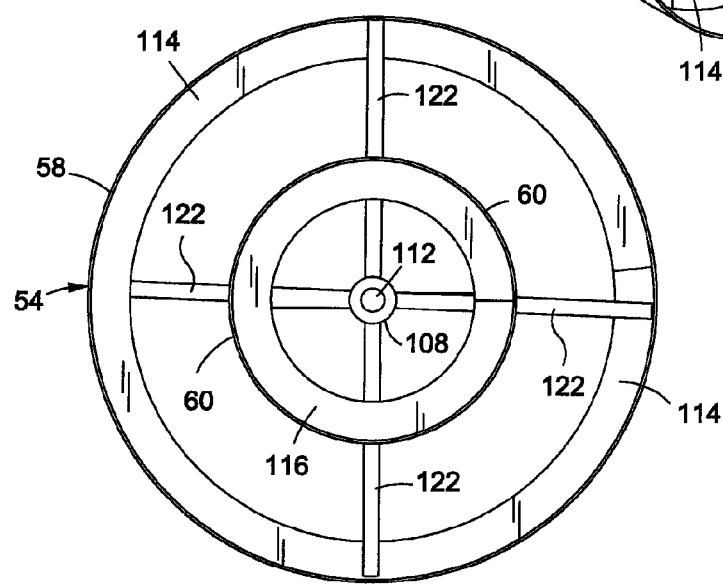
Figure 10:
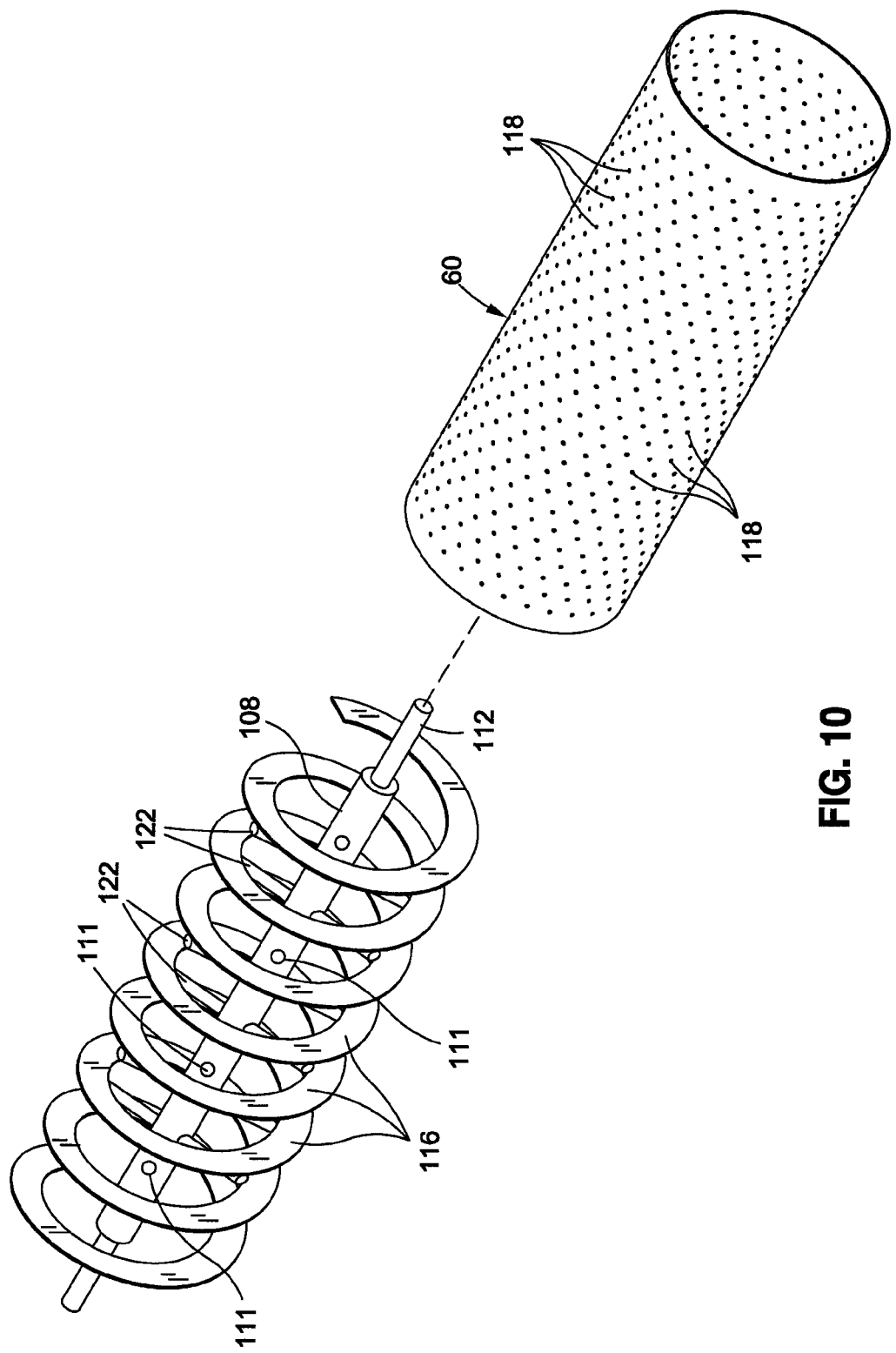
Figure 11:
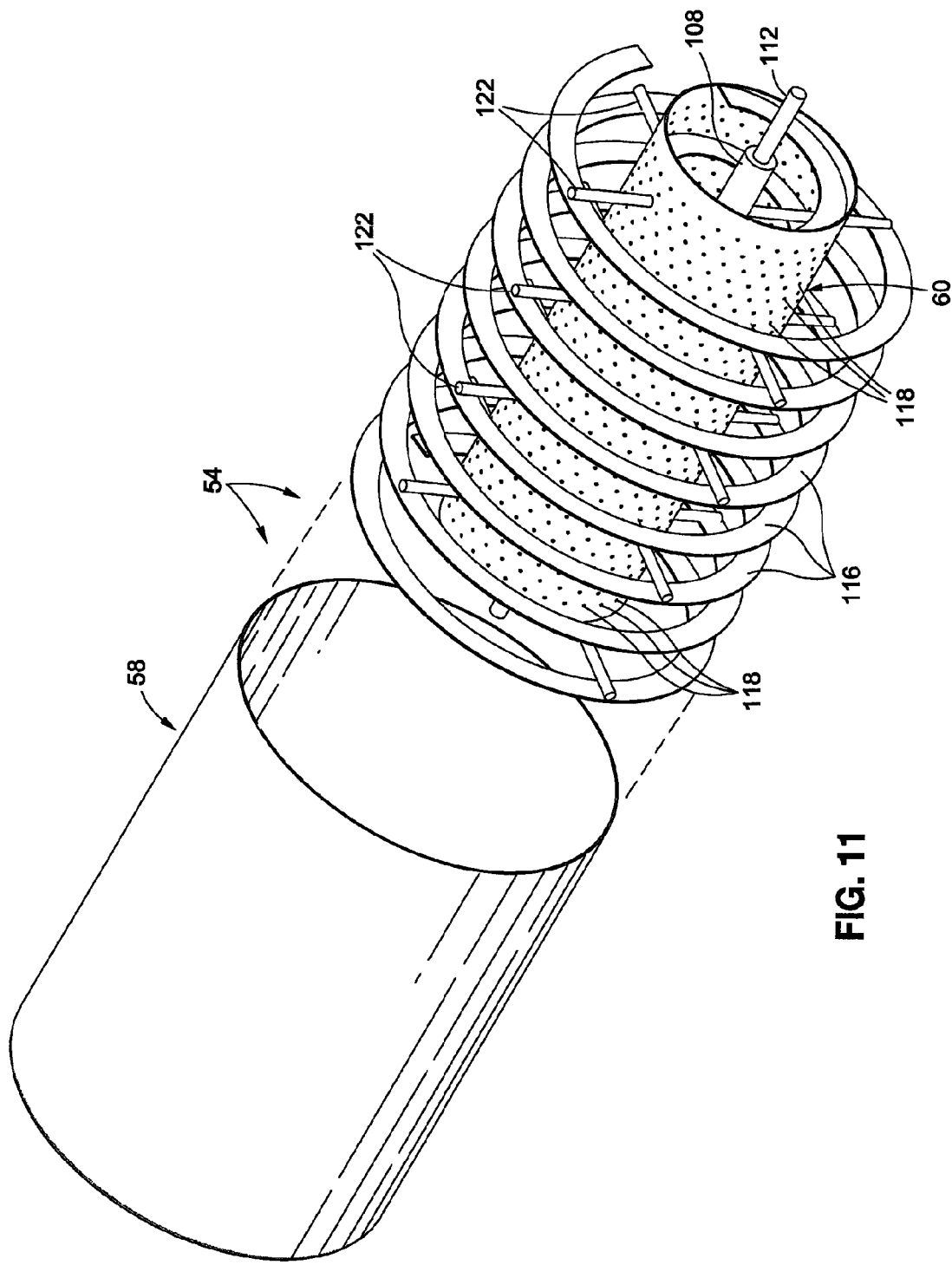

Turning to FIGS. 2-4 of the drawings, an enlargement is shown of the compound auger assembly 22 of the waste management system 1 that was described when referring to FIG. 1. As previously disclosed, the compound auger assembly 22 includes a pair of sequential augers 30 and 32 that are connected end-to-end and joined together by a support bearing 37. Each of the augers 30 and 32 of assembly 22 has a shaft 31 and 33 and a helically-wound blade 34 and 36 which spirals along the shafts. The shafts 31 and 33 are rotated at the same speed by a motor 38 in order to push the compressed shredded organic waste through the assembly 22 and repeatedly squeeze all of the liquid therefrom. The shredded waste is delivered (e.g., pumped) to the second auger 30 of the compound auger assembly 22 from the first auger (designated 7 in FIG. 1) through a pipe 20 which has an ideal diameter of 8 to 9 inches. The pipe 20 terminates at an inlet port 25 at the intake end of auger 30. Drain 26 is shown located within the pipe 20 so that liquid which leaks from the shredded waste that has been compressed by the upstream first auger 7 flows to the mixer tank (designated 16 in FIG. 1) by way of drain pipe 28.

As was also previously described, successive turns of the helically-wound blades 34 and 36 of augers 30 and 32 are spaced closer together from the intake ends of augers 30 and 32 to the opposite exit ends thereof. Moreover, the turns of the helically-wound blade 34 which spiral around the shaft 31 of the second auger 30 lying closest to the pipe 20 are thicker than the turns of the helically-wound blade 36 which spiral around the shaft 33 of the third auger 32. What is more, the angle made by the turns of the helically-wound blade 34 of the auger 30 (relative to a vertical reference line) is greater than the angle made by the turns of the helically-wound blade 36 of auger 32. By virtue of the foregoing parameters, the blades 34 and 36 of the shafts 31 and 33 of the augers 30 and 32 are simultaneously rotated by the motor 38 to increase the compressive force and more effectively extract liquid as the shredded waste is moved through the augers 30 and 32 of the compound auger assembly 22.

Although the compound auger assembly 22 is shown having a pair of axially-aligned augers 30 and 32, it is to be understood that the pair of augers may be replaced by a single auger having a single shaft to be rotated by the motor 38. Having a pair of augers advantageously maximizes the compressive force applied to the solid waste and permits one auger to be removed for repair or substitution as may become necessary to ensure a continuous operation of the waste management system 1.

Each auger 30 and 32 of the compound auger assembly 22 has a conically-shaped casing 92 and 94 which surrounds the respective shafts and the helically-wound blades 34 and 36 thereof. Each of the casings 92 and 94 has a set of drain holes 96 and 98 formed through the bottom to enable the liquid that is extracted from the shredded waste by the rotating blades 34 and 36 to flow into the mixer tank (16 of FIG. 1) by way of respective liquid collection pans 100 and 102 and the common auger assembly drain pipe 40 which communicates therewith. The helically-wound blades 34 and 36 of augers 30 and 32 are dimensioned to engage the conical casings 92 and 94 and thereby wipe the drain holes 96 and 98 clean so as to remove any debris that has accumulated as the solid organic waste is pushed through the compound auger assembly 22.

A wiping blade 104 is affixed to and rotated with the shaft 33 of the third auger 32 adjacent the perforated sizing plate 52 at the exit end of auger 32. The rotating wiping blade 104 wipes and cleans the perforations formed in the sizing plate 52 so as not to interfere with the cutting ad delivery of the dehydrated waste pieces from the compound auger assembly 22 to the intake chute 56 of the heating dryer 54.

Details of the dual drum heating dryer 54 of the waste management processing system 1 of FIG. 1 are provided while referring concurrently to FIGS. 5-10 of the drawings. As previously described, the heating dryer 54 includes a stationary outer drum 58 and a rotating inner drum 60 that are coaxially aligned with respect to a shaft 108 that runs longitudinally through the inner drum 60. The drums 58 and 60 and the shaft 112 are held in coaxial alignment by a pair of opposing stationary end caps 106 and 107 (best shown in FIGS. 6 and 7) that are affixed to the outer drum 58 by means of high temperature seals. The shaft 108 is hollow and communicates at one end thereof with heating chute 62 so that hot air can be supplied through the shaft from a source of heat, such as a propane heater (not shown). To this end, the shaft 108 is provided with a series of vent holes 111 spaced therealong so that heat delivered to the shaft via the chute 62 can be distributed throughout the inner drum 60 of dryer 54 which surrounds shaft 108. The end of shaft 108 which lies opposite the heater chute 62 is attached to a spindle 112 that extends through end cap 106 for receipt of a rotational force that is imparted thereto by a motor (also not shown).

The stationary outer drum 58 of the dual drum heating dryer 54 has a diameter which is greater than that of the rotating inner drum 60. The outer drum 58 includes a blade 114 which spirals continuously therethrough and surrounds the inner drum 60. The inner drum 60 includes a blade 116 which spirals continuously therethrough and surrounds the shaft 108. The blade 116 is affixed (e.g., welded) to and rotatable with the inner drum 60. Each of the turns of the spiraling blades 114 and 116 is angled and adapted to rotate in a manner that will soon be described in order to facilitate the movement of the wet waste pieces that are delivered from the compound auger assembly (22 of FIG. 1) to the inner drum 60 of heater 54 by way of the intake chute 56 thereof.

That is, as the turns of the blades 114 and 116 of the outer and inner drums 60 and 58 rotate, the waste pieces are pushed and axially advanced first through the inner drum 60, then through the outer drum 58, and finally outwardly from the dual drum heating dryer 54 so as to drop into the intake chute 68 of the pelletizer (66 of FIG. 1). The inner drum 60 of the dryer 54 is covered by perforations 118 formed therethrough so that the heat being supplied down the hollow shaft 108 from the heater duct 62 will be emitted from the shaft vent holes 111 and evenly distributed outwardly from the drum perforations 118 to the waste pieces that move through the inner and outer drums 58 and 60. In this same regard, to increase the heat applied to the waste pieces being dried, an optional electric heating blanket or band 110 (best shown in FIG. 5) is wrapped around the stationary outer drum 58 of the heating dryer 54. The dual drum heating dryer 54 is coupled to the vacuum pump (46 in FIG. 1) by means of a vacuum hose 120 so that moisture can be suctioned from the wet waste pieces at the same time that the waste pieces are heated and dried.

As is best shown in FIGS. 8-11, a number of perpendicularly-aligned support rods 122 run through the shaft 108 and the inner drum 60 of the dual drum heating dryer 54 to be connected to the turns of the blade 114 which spirals through the outer drum 58 and surrounds inner drum 60. Thus, a rotation of the motor-driven shaft 108 causes a corresponding rotation of the inner drum 60, the spiraling blade 116 affixed to the inner drum 60, and the spiraling blade 114 inside the outer drum 58 in order to push the wet waste pieces through the heating dryer 54 to be heated and dried. As previously explained, the outer drum 58 of dryer 54 remains stationary as the inner drum 60 and the spiraling blades 114 and 116 are rotated along with the shaft 108 by means of the support rods 122 which are interconnected therewith.

The heated and dried organic waste pieces which exit the dual drum heating dryer 54 are dropped under the influence of gravity into the intake chute 68 of the pelletizer 66. As was previously explained, and turning now to FIG. 12 of the drawings, the pelletizer 66 includes a cylindrical housing 72 having a shaft 70 running longitudinally therethrough. The shaft 70 is coupled to and rotated by a motor 124. As was also previously explained, the pelletizer 66 may be identical to the pelletizer that is shown and described in my published Patent Application No. US2013/0205613. A blade 74 spirals around and is rotated by the shaft 70 to advance the heated and dried waste pieces through housing 72 from the intake end of pelletizer 66 adjacent the intake chute 68 to the pellet-shaping plate 75 at the exit end of pelletizer 66. The waste pieces are forced through apertures formed in the shaping plate 75 to create solid (i.e., dense) organic pellets from the waste that was initially shredded by the shredder (5 of FIG. 1).

The pellets fall under the influence of gravity into the outlet chute 76 of pelletizer 66 by way of the heat containment enclosure 78 located adjacent the pellet-shaping plate 75 at the exit end of the pelletizer. Hot air is supplied to the heat containment enclosure 78 to ensure that the pellets are completely dry. The hot air supplied to enclosure 78 may originate from the same or a different source as that associated with the dual drum heating dryer 54. At the same time, any remaining moisture is suctioned by the vacuum pump (46 of FIG. 1) out of the heat containment enclosure 78 and into the mixer tank (16 of FIG. 1) by way of a vacuum hose 126. The hot, solid and dry organic pellets are dropped into the outlet chute 76 of pelletizer 66 for delivery to the dual drum cooling dryer (82 of FIG. 1) via the intake chute 80 thereof.

FIGS. 13 and 14 show an alternate embodiment for the pelletizer 66 shown in FIG. 12. The modified pelletizer 130 includes a conical (rather than a cylindrical) housing 132. A shaft 134 runs longitudinally through the housing 132 to be coupled to and rotated by a motor (designated 135 in FIG. 15). Like the first, second and third augers (designated 7, 30 and 32 in FIG. 1), a helically-wound blade 136 spirals continuously along the shaft 134. The distance between successive turns of the blade 136 decreases from the intake end of pelletizer 130 adjacent intake chute 68 to the opposite exit end. Moreover, the height (designated 138 in FIG. 13) of successive turns of the blade 136 relative to the shaft 134 decreases from the intake and to the opposite exit end of pelletizer 130. Thus, the profile of the helically-wound blade 136 of pelletizer 130 conforms to the conical shape of the conical housing 132.

An inlet cover 139 is affixed across the conical housing 132 at the wide intake end of the pelletizer 130 by means of fasteners (e.g., bolts). An outlet disk 140 is affixed across the housing 132 at the narrow exit end of the pelletizer 130 by means of fasteners (e.g., bolts) being received through openings (e.g., bolt holes) 142 formed through the disk 140. A series of round apertures 144 are also formed around the periphery of the outlet disk 140. The apertures 144 are positioned so that the waste pieces that are advanced through the housing 132 of pelletizer 130 by a rotation of helical blade 136 are pushed through apertures 144. Thus, the apertures 144 formed in the outlet disk 140 establish a generally-uniform shape for the pellets which exit the pelletizer 130. As is best shown in FIG. 15, the solid dry pellets that are created by the apertures 144 formed in the outlet disk 140 are heated within the same heat containment enclosure 78 that was previously described in association with the pelletizer 66 shown in FIG. 12.

Figure 15:
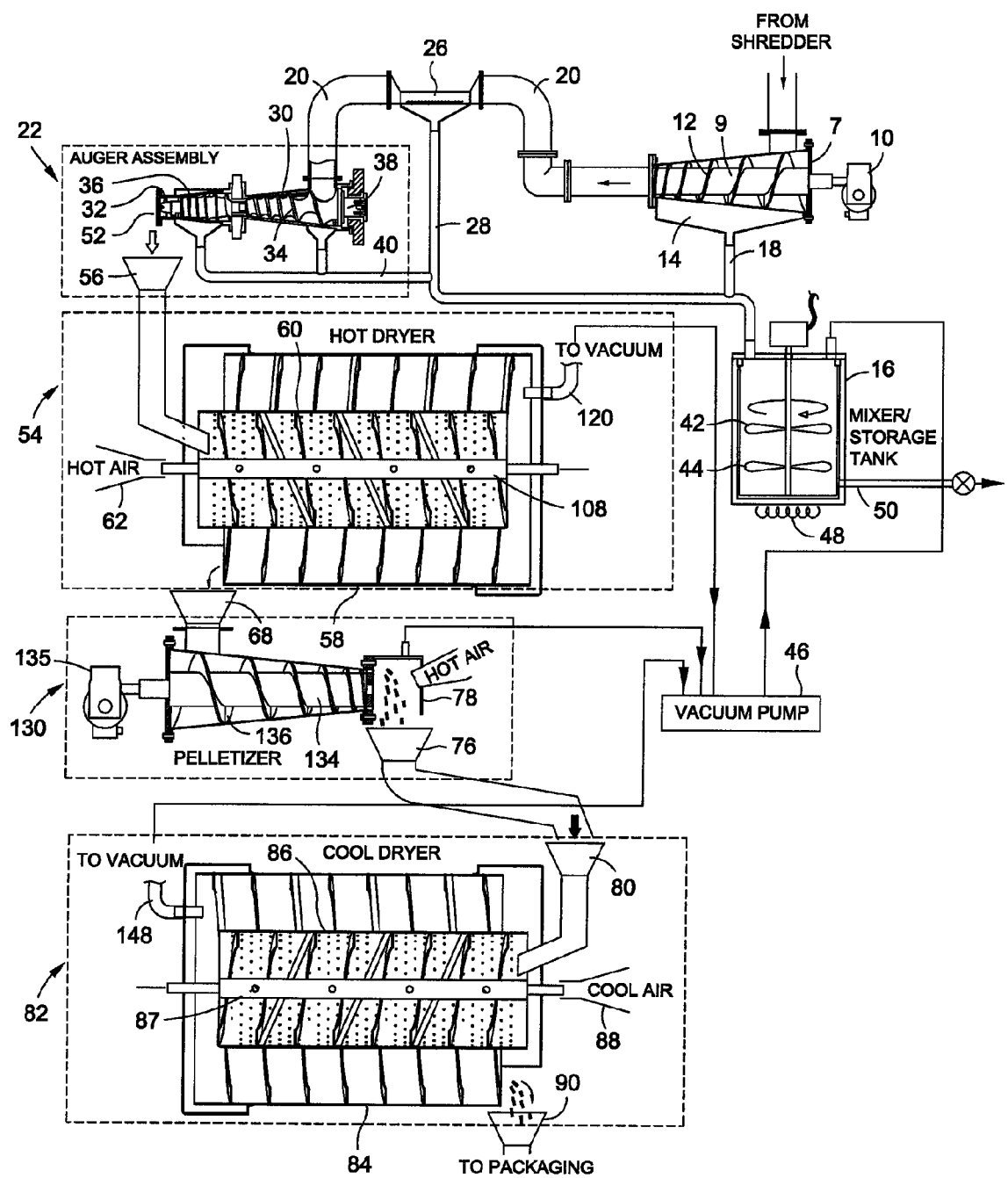
FIG. 15 illustrates an alternate preferred embodiment for a waste management system for processing organic waste.

FIG. 15 of the drawings shows a waste management system 1-1 according to an alternate preferred embodiment of this invention. As in the case of the waste management system 1 shown in FIG. 1, the alternate system 1-1 of FIG. 15 includes a first auger 7 that is connected by a pipe 20 to a compound auger assembly 22 so that shredded waste can be pushed through three series connected augers 7, 30 and 32 during which the waste is compressed and cut into smaller pieces and liquid is extracted therefrom. Identical reference numerals have been used to denote those elements of the alternate waste management system 1-1 of FIG. 15 that are common to the waste management system 1 of FIG. 1.

The liquid that is extracted when the shredded waste is compressed by the rotating helically-wound blades 12, 34 and 36 of augers 7, 30 and 32 is collected in respective pans 14, 100 and 102 and carried to the mixer tank 16 by drain pipes 18 and 40. Moreover, a drain 26 is connected within the pipe 20 between the first auger 7 and the compound auger assembly 22 so that additional liquid which leaks from the shredded waste is also carried to the mixer tank 16 via a drain pipe 28.

The waste pieces which are cut by the perforated sizing plate 52 of the auger 32 of compound auger assembly 22 are first delivered to the dual drum heating dryer 54 where the pieces are moved by respective spiraling blades through stationary outer and rotating inner drums 58 and 60 to be heated and dried by hot air supplied thereto via a hollow vented shaft 108. The waste pieces which exit the dual drum heating dryer 54 are then delivered to a pelletizer 130 where the pieces are moved therethrough by a helically-wound blade 136 and shaped by the apertures in outlet disk 140 to form generally uniform pellets. The pelletizer 130 shown in FIG. 15 is identical to that shown in FIGS. 13 and 14. The pellets which exit the pelletizer 130 are first heated and dried by a heat containment enclosure 78 of pelletizer 130 and then dropped into a dual drum cooling dryer 82 by way of an outlet chute 80 of the pelletizer 130 and an intake chute 80 of the cooling dryer 82.

The dual drum cooling dryer 82 is preferably identical in construction and operation to the aforementioned dual drum heating dryer 54 of FIGS. 5-11 and, therefore, the details of the cooling dryer will not be provided. Briefly, however, the heated and dried pellets produced by the pelletizer 130 are moved by respective spiraling blades through stationary outer and rotating inner coaxially-aligned drums 84 and 86 that surround a hollow, rotating motor-driven shaft having vent holes (identical to those designated 111 in FIG. 5) formed therein. Support rods (identical to those designated 122 in FIG. 8) connect the rotating shaft of the cooling dryer 82 with the rotating inner drum 86 thereof and the spiraling blade that is surrounded by the stationary outer drum 84. The heated pellets which move through the drums 84 and 86 of the cooling dryer 82 are cooled and further dried by a supply of cool or refrigerated air that is supplied thereto by way of an axially-aligned cooling duct 88, the vent holes formed in the hollow shaft 87 and perforations (identical to those designated 118 in FIG. 5) formed through the inner drum 86. Moisture is removed from the cooling dryer 82 to the mixer tank 16 by means of a vacuum pump 46 that is coupled between mixer tank 16 and a vacuum hose 148 of the cooling dryer. The cool and dry pellets are now pushed outwardly from one end of the outer drum 84 of the dual drum cooling dryer 82 so as to fall into a packaging chute 90 for collection, packaging and distribution.

Both of the heating and cooling dryers 54 and 82 shown in FIGS. 1 and 15 are described as including coaxially-aligned stationary outer and rotating inner drums that surround a vented shaft. FIG. 16 of the drawings shows a modified heating and cooling dryer 150 where the aforementioned pair of coaxially-aligned drums are separated into a pair of rotating drums 152 and 154 that are arranged in series one after the other in a corresponding pair of heating/cooling stages. In this case, each drum 152 and 154 surrounds a hollow rotating shaft 156 and 158 that extends longitudinally between stationary end caps and has a series of vent holes 160 and 162 formed therein. A first blade 164 spirals along and is affixed (e.g., welded) inside the first drum 152, and a second blade 166 spirals along and is affixed (e.g., welded) inside the second drum 154. The shafts 156 and 158 are coupled to one another so that the drums 152 and 154 and the spiraling blades 164 and 166 carried thereby are simultaneously rotated.

Waste material to be heated or cooled and dried is delivered inside one end of the drum 152 of the first stage via an intake chute 168 of the heating/cooling dryer 150. The waste material that is rotated within and advanced through drum 152 is delivered inside one end of the drum 154 of the second stage via an interface chute 170 lying therebetween. The waste material that is rotated within and advanced through drum 154 drops into an outlet chute 172 of the heating/cooling dryer 150. The hollow shafts 156 and 158 that are surrounded by the first and second drums 152 and 154 communicate with a source of hot or cold air to be distributed to the waste material via heating/cooling ducts 174 and 176 and the vent holes 160 and 162 formed in shafts 156 and 158.

By virtue of the waste management systems 1 and 1-1 herein disclosed, raw organic waste is efficiently and relatively inexpensively processed so that solid, dry pellets can be delivered to a packaging station within about 30 minutes to one hour so as to advantageously and greatly reduce the time required by conventional composting machines to achieve a similar result.

The invention claimed is:

1. A method for processing organic waste comprising the steps of:
    loading organic waste into a waste compression means having a rotatable blade and rotating said rotatable blade for squeezing the organic waste and extracting liquid therefrom;
    collecting the liquid extracted as a result of the rotatable blade of said waste compression means rotating and squeezing the organic waste;
    heating and drying the organic waste within a heating drum after the liquid has been extracted therefrom;
    rotating said heating drum by a hollow rotating shaft that runs axially through said heating drum and has a plurality of vent holes formed therein;

supplying heat from a source thereof to said hollow shaft to be distributed to the organic waste within said heating drum by way of the plurality of vent holes formed in said hollow shaft;

shaping the organic waste that has been heated and dried within said heating drum to produce solid organic waste pellets;

cooling said solid organic waste pellets by means of a cooler including a stationary outer drum, a rotating inner drum, a rotating shaft surrounded by and coaxially aligned with said outer and inner drums, a first blade spiraling through said stationary outer drum, a second blade spiraling through and attached to said rotating inner drum, and a plurality of support rods which connect said rotating shaft that is surrounded by said outer and inner drums to the rotating inner drum and to the first spiraling blade of said outer drum;

simultaneously rotating the shaft of said cooler, the rotating inner drum of said cooler, and the first and second blades of said cooler relative to the stationary outer drum of said cooler to cause the organic waste to move through each of the outer and inner drums of said cooler; and collecting said cooled solid organic waste pellets that have been cooled by said cooler.

2. The method for processing organic waste as recited in claim 1, comprising the additional step of using the liquid collected as a result of squeezing the organic waste as one of a fuel or a liquid fertilizer.

3. A waste management system for processing organic waste, comprising:

waste compression means having at least one blade by which to squeeze and extract liquid from the organic waste received by said waste compression means;

a storage tank communicating with said waste compression means to collect the liquid extracted from the organic waste squeezed by said at least one blade;

a dryer coupled to said waste compression means to receive the organic waste after the liquid has been extracted therefrom, said dryer communicating with a source of hot air to be distributed to the organic waste received by said dryer by which to heat and dry the organic waste;

a pelletizer coupled to said dryer to receive the organic waste after the organic waste has been heated and dried, said pelletizer shaping the heated and dried organic waste; and a cooler coupled to said pelletizer to receive the organic waste therefrom after the organic waste has been shaped, said cooler communicating with a source of cool air to be distributed to the organic waste received from said pelletizer by which the shaped organic waste is cooled, said cooler including a stationary outer drum, a rotating inner drum, a rotating shaft surrounded by and coaxially aligned with said outer and inner drums, a first blade spiraling through said outer drum, and a second blade spiraling through and attached to said inner drum, said rotating shaft, said rotating inner drum, and said first and second blades being connected to one another so as to be simultaneously rotated to cause the organic waste to move first through the inner drum of said cooler and then through the outer drum thereof, wherein the rotating shaft of said cooler includes a series of vent holes and the rotating inner drum of said cooler includes a plurality of perforations, said rotating shaft communicating with the source of cool air to enable cool air from said source to be distributed to the organic waste moving through said outer and inner drums by way of the series of vent holes in said rotating shaft and the plurality of perforations in said inner drum.

4. A waste management system for processing organic waste, comprising:

waste compression means having at least one blade by which to squeeze and extract liquid from the organic waste received by said waste compression means;

a storage tank communicating with said waste compression means to collect the liquid extracted from the organic waste squeezed by said at least one blade;

a dryer coupled to said waste compression means to receive the organic waste after the liquid has been extracted therefrom, said dryer communicating with a source of hot air to be distributed to the organic waste received by said dryer by which to heat and dry the organic waste;

wherein said dryer includes a stationary outer drum, a rotating inner drum, a rotating shaft surrounded by and coaxially aligned with said outer and inner drums, a first blade spiraling through said outer drum, and a second blade spiraling through and attached to said inner drum, said rotating shaft, said rotating inner drum, and said first and second blades being connected to one another so as to be simultaneously rotated to cause the organic waste to move first through the inner drum of said dryer and then through the outer drum thereof, wherein the rotating shaft of said dryer includes a series of vent holes and the rotating inner drum of said dryer includes a plurality of perforations, said rotating shaft communicating with the source of hot air to enable hot air from said source to be distributed to the organic waste moving through said outer and inner drums by way of the series of vent holes in said rotating shaft and the plurality of perforations in said inner drum;

a pelletizer coupled to said dryer to receive the organic waste after the organic waste has been heated and dried, said pelletizer shaping the heated and dried organic waste; and a cooler coupled to said pelletizer to receive the organic waste therefrom after the organic waste has been shaped, said cooler communicating with a source of cool air to be distributed to the organic waste received from said pelletizer by which the shaped organic waste is cooled, said cooler including a stationary outer drum, a rotating inner drum, a rotating shaft extending longitudinally through said rotating inner drum so as to be surrounded by and coaxially aligned with said outer and inner drums, a first blade spiraling through said stationary outer drum, a second blade spiraling through and attached to said rotating inner drum, and a plurality of support rods which connect said rotating shaft that is surrounded by said outer and inner drums to said rotating inner drum and to the first spiraling blade of said outer drum, such that the rotating shaft that is surrounded by said outer and inner drums and said first and second blades are simultaneously rotated relative to said stationary outer drum to cause the organic waste to move through each of the outer and inner drums of said cooler.

5. The waste management system recited in claim 4, wherein said waste compression means includes an auger comprising a tapered housing having a relatively wide intake end at which to receive the organic waste to be processed and a relatively narrow opposite exit end, a rotating shaft located within said tapered housing, and a helically-wound blade that spirals around and rotates with said rotating shaft within said tapered housing in order to squeeze and move the organic waste through the tapered housing of said auger so that liquid is extracted from the organic waste, said helically-wound blade having a series of turns running axially along said rotating shaft, wherein said series of turns have changing heights relative to said rotating shaft which decrease continuously in a direction from the relatively wide intake end of said tapered housing towards the relatively narrow exit end thereof, such that each of said tapered housing and said helically wound blade has a conical profile.

6. A waste management system for processing organic waste, comprising:
a first auger including a tapered housing having a relatively wide intake end at which to receive the organic waste to be processed and a relatively narrow opposite exit end, a rotating shaft located within said tapered housing, and a helically-wound blade that spirals around and rotates with said rotating shaft within said tapered housing in order to squeeze and move the organic waste through the tapered housing of said first auger so that liquid is extracted from the organic waste, said helically-wound blade having a series of turns running axially along said rotating shaft, wherein said series of turns have changing heights relative to said rotating shaft which decrease continuously in a direction from the relatively wide intake end of said tapered housing towards the relatively narrow exit end thereof, such that each of said tapered housing and said helically wound blade has a conical profile;
a storage tank communicating with said first auger to collect the liquid extracted from the organic waste squeezed by said helically-wound blade;
a dryer communicating with the exit end of said first auger to receive the organic waste after the liquid has been extracted therefrom, said dryer communicating with a source of hot air to be distributed to the organic waste received by said dryer by which to heat and dry the organic waste and said dryer including at least a first drum within which to receive the organic waste from the exit end of said first auger, said first drum surrounding a rotating shaft which extends longitudinally through said first drum and a first blade carried by the rotating shaft of said first drum, said first blade rotating with the rotating shaft of said first drum so as to move the organic waste through said first drum, and wherein the rotating shaft of said first drum includes a series of vent holes formed therein, the rotating shaft of said first drum coupled to the source of hot air to enable hot air from said source to be distributed to the organic waste moving through said first drum by way of the series of vent holes formed in said shaft;
a pelletizer coupled to said dryer to receive the organic waste after the organic waste has been heated and dried, said pelletizer shaping the heated and dried organic waste; and
a cooler coupled to said pelletizer to receive the organic waste therefrom after the organic waste has been shaped, said cooler communicating with a source of cool air to be distributed to the organic waste received from said pelletizer by which the shaped organic waste is cooled, said cooler including a stationary outer drum, a rotating inner drum, a rotating shaft extending longitudinally through said rotating inner drum so as to be surrounded by and coaxially aligned with said outer and inner drums, a first blade spiraling through said stationary outer drum, a second blade spiraling through and attached to said rotating inner drum, and a plurality of support rods which connect said rotating shaft that is surrounded by said outer and inner drums to said rotating inner drum and to the first spiraling blade of said outer drum, such that the rotating shaft that is surrounded by said outer and inner drums and said first and second blades are simultaneously rotated relative to said stationary outer drum to cause the organic waste to move through each of the outer and inner drums of said cooler.

7. The waste management system recited in claim 6, wherein successive turns of said helically-wound blade are spaced closer together from the intake end to the exit end of said first auger.

8. The waste management system recited in claim 6, wherein the tapered housing of said first auger has drain holes formed therein through which the liquid extracted from the organic waste is supplied from said first auger to said storage tank.

9. The waste management system recited in claim 8, wherein the heights of successive turns of said helically-wound blade running axially along the rotating shaft located within the tapered housing of said first auger are dimensioned relative to said tapered housing so as to wipe against and clean said drain holes formed in said tapered housing in response to said helically-wound blade being rotated by said shaft.

10. The waste management system recited in claim 6, further comprising a second auger having a helically-wound blade that spirals along and is rotated by a rotating shaft, said second auger coupled to said first auger so that the organic waste that is squeezed and moved through said first auger is squeezed by the helically-wound blade of said second auger and moved through said second auger to extract additional liquid to be collected by said storage tank.

11. The waste management system recited in claim 10, further comprising a pump located between said first auger and said second auger, said pump supplying the organic waste that has been squeezed and moved through said first auger to said second auger.

12. The waste management system recited in claim 10, further comprising a liquid drain located between said first auger and said second auger, said drain communicating with said storage tank.

13. The waste management system recited in claim 10, wherein the second auger has an intake end that is coupled to the exit end of said first auger and an opposite exit end, successive turns of the helically-wound blade of said second auger being spaced closer together from the intake end to the exit end of said second auger.

14. The waste management system recited in claim 10, wherein the turns of the helically-wound blade of said first auger are thicker than the turns of the helically-wound blade of said second auger.

15. The waste management system recited in claim 6, wherein said dryer also includes a second drum surrounding said at least said first drum, such that said rotating shaft which extends longitudinally through said first drum is coaxially aligned with said first and second drums, a second blade spiraling through said second drum, and a plurality of support rods which connect said longitudinally extending rotating shaft to said first drum and to the second blade which spirals through said second drum, such that said longitudinally extending rotating shaft, said first drum, the first blade that is carried by said longitudinally extending rotating shaft, and the second blade that spirals through said second drum are all simultaneously rotated while said second drum which surrounds said first drum remains stationary in order to cause the organic waste to move through each of the first and second drums of said dryer, said first drum including a plurality of perforations by which the hot air from said source thereof is distributed to the organic waste moving through said first drum and said second drum by way of the series of vent holes formed in said longitudinally extending rotating shaft and said plurality of perforations formed in said first drum.

16. The waste management system recited in claim 6, wherein said rotating shaft extending longitudinally through the rotating inner drum of said cooler includes a series of vent holes formed therein, said rotating shaft communicating with the source of cool air to enable cool air from said source to be distributed to the organic waste moving through each of the outer and inner drums of said cooler by way of the series of vent holes in said rotating shaft.

17. The waste management system recited in claim 6, wherein the rotating shaft of said cooler includes a series of vent holes and the rotating inner drum of said cooler includes a plurality of perforations, the rotating shaft of said cooler communicating with the source of cool air to enable cool air from said source to be distributed to the organic waste moving through said outer and inner drums by way of the series of vent holes in the rotating shaft of said cooler and the plurality of perforations in said inner drum.

18. The waste management system recited in claim 6, wherein said pelletizer includes a rotating shaft and a blade carried by and rotated with the rotating shaft of said pelletizer by which to move the organic waste through said pelletizer to said cooler, said pelletizer having an intake end communicating with said dryer, an exit end communicating with said cooler, and a shaping plate having apertures formed therein and being located across said exit end through which said organic waste is pushed in response to said pelletizer blade rotating with the rotating shaft of said pelletizer so that the organic waste is shaped according to the apertures of said shaping plate.

19. The waste management system recited in claim 18, further comprising a heat containment enclosure coupled to the exit end of said pelletizer and communicating with said source of hot air by which the organic waste that is shaped by the shaping plate located across the exit end of said pelletizer is heated and dried.

20. The waste management system recited in claim 18, wherein the blade carried by and rotated with the rotating shaft of said pelletizer is a helically-wound blade that spirals along said rotating shaft to move the organic waste through said pelletizer, said helically-wound blade having a conical profile and said pelletizer having a conical housing within which said rotating shaft of said pelletizer and said helically-wound blade are located.

* * * * *